US 7,937,679 B2

(12) United States Patent
Mariani (10) Patent No.: US 7,937,679 B2
(45) Date of Patent: May 3, 2011

(54) METHOD FOR PERFORMING FAILURE MODE AND EFFECTS ANALYSIS OF AN INTEGRATED CIRCUIT AND COMPUTER PROGRAM PRODUCT THEREFOR

(75) Inventor: Riccardo Mariani, Pisa (IT)

(73) Assignee: Yogitech S.p.A., S. Giuliano Terme Pisa (IT)

( * ) Notice: Subject to any disclaimer, the term of this patent is extended or adjusted under 35 U.S.C. 154(b) by 470 days.

(21) Appl. No.: 12/101,585

(22) Filed: Apr. 11, 2008

(65) Prior Publication Data

US 2008/0276206 A1 Nov. 6, 2008

(30) Foreign Application Priority Data

Apr. 13, 2007 (EP) .................................. 07106186

(51) Int. Cl.
*G06F 17/50* (2006.01)
*G06F 9/455* (2006.01)
*G06F 11/00* (2006.01)

(52) U.S. Cl. ........ 716/104; 716/100; 716/101; 716/103; 716/105; 716/106; 716/112; 716/117; 714/26; 714/37; 714/47; 714/57

(58) Field of Classification Search .................. 716/1, 2, 716/4, 5, 6, 7, 11, 18; 714/26, 37, 47, 57; 703/1, 2, 14, 22
See application file for complete search history.

(56) References Cited

U.S. PATENT DOCUMENTS

| | | | |
|---|---|---|---|
| 4,228,537 A | | 10/1980 | Henckels et al. |
| 5,109,380 A | * | 4/1992 | Ogino ............................. 714/26 |
| 5,269,014 A | * | 12/1993 | Ogino ............................. 703/22 |
| 5,546,321 A | * | 8/1996 | Chang et al. ...................... 716/1 |
| 5,548,539 A | * | 8/1996 | Vlach et al. ....................... 703/6 |
| 5,646,862 A | * | 7/1997 | Jolliffe et al. .................... 703/1 |
| 6,658,375 B1 | * | 12/2003 | McQuarrie et al. ............... 703/2 |
| 6,909,994 B2 | * | 6/2005 | Johnson et al. ............... 702/185 |
| 7,017,080 B1 | * | 3/2006 | Liggesmeyer et al. ......... 714/26 |
| 7,035,769 B2 | | 4/2006 | Cutuli et al. |

(Continued)

FOREIGN PATENT DOCUMENTS

| | | |
|---|---|---|
| IT | 01319009 | 9/2003 |
| JP | 02-016471 | 1/1990 |

OTHER PUBLICATIONS

Price; "AutoSteve: electrical desThroop et al.;ign analysis"; Publication Year: 1997; Applications of Model-Based Reasoning (Digest No: 1997/338), IEE Colloquium on; pp. 4/1-4/3.*

(Continued)

*Primary Examiner* — Helen Rossoshek
(74) *Attorney, Agent, or Firm* — Heslin Rothenberg Farley & Mesiti P.C.; Victor A. Cardona, Esq.

(57) ABSTRACT

A method for performing failure mode and effects analysis (FMEA) on integrated circuits including preparing a FMEA database of an integrated circuit under design and computing FMEA results from the FMEA database. Information is automatically extracted from an integrated circuit description. The extraction of information includes reading integrated circuit information, partitioning the circuit in invariant and elementary sensitive zones (SZ), using the information in the preparation step of a FMEA database. Optionally a FMEA validation stage may be performed with which FMEA computed results are compared with FMEA measured results to obtain FMEA validated results.

31 Claims, 7 Drawing Sheets

U.S. PATENT DOCUMENTS

| | | | |
|---|---|---|---|
| 7,082,384 B2 * | 7/2006 | Sasaki et al. | 702/184 |
| 7,139,676 B2 * | 11/2006 | Barford | 702/183 |
| 7,177,773 B2 * | 2/2007 | Lonn et al. | 702/81 |
| 7,200,543 B2 * | 4/2007 | Palladino | 703/14 |
| 7,260,501 B2 * | 8/2007 | Pattipatti et al. | 702/183 |
| 7,536,284 B2 * | 5/2009 | Linzey et al. | 703/2 |
| 2005/0028045 A1 * | 2/2005 | Kawaike | 714/47 |
| 2005/0254456 A1 | 11/2005 | Sakai et al. | |
| 2006/0122873 A1 | 6/2006 | Minotto | |
| 2008/0034258 A1 * | 2/2008 | Moriya et al. | 714/57 |
| 2009/0113247 A1 * | 4/2009 | Gofuku et al. | 714/37 |
| 2010/0125746 A1 * | 5/2010 | Herrmann et al. | 714/1 |

OTHER PUBLICATIONS

Throop et al.; "Automated incremental design FMEA"; Publication Year: 2001; Aerospace Conference, 2001, IEEE Proceedings; vol. 7; pp. 7-3458 vol. 7.*

Kukkal et al.; "Database design for failure modes and effects analysis"; Publication Year: 1993; Reliability and Maintainability Symposium, 1993. Proceedings., Annual; pp. 231-239.*

Papadopoulos et al.; "Automating the failure modes and effects analysis of safety critical systems"; Publication Year: 2004; High Assurance Systems Engineering, 2004. Proceedings. Eighth IEEE International Symposium on; pp. 310-311.*

European Search Report from corresponding European Patent Application No. EP 07106186 completed May 29, 2007.

Yiannis Papadopoulos et al., "A Method and Tool Support for Model-based Semi-automated Failure Modes and Effects Analysis of Engineering Designs", Safety Critical Systems and Software, XX, XX, vol. 47, Oct. 2004, XP002413947.

Palumbo, D., "Automating failure modes and effects analysis", Reliability and Maintainability Symposium, 1994. Proceedings., Annual Anaheim, CA, USA Jan. 24-27, 1994, New York, NY, USA, IEEE Jan. 24, 1994, pp. 304-309, XP010120628; ISBN: 0-7803-1786-6.

* cited by examiner

METHOD FOR PERFORMING FAILURE MODE AND EFFECTS ANALYSIS OF AN INTEGRATED CIRCUIT AND COMPUTER PROGRAM PRODUCT THEREFOR

CROSS-REFERENCE TO RELATED APPLICATIONS

This application claims priority from European patent application No. EP 07106186.5 filed on Apr. 13, 2007, the entire disclosure of which is incorporated herein by reference.

FIELD OF THE INVENTION

The present invention relates to a method to perform Failure Mode and Effects Analysis (FMEA) of an integrated circuit under design. Such circuit can be any integrated circuit (IC) composed by a plurality of transistors, grouped in logic gates or in any other digital or analogue function.

The present invention also relates to an optional method for validating said Failure Mode and Effects Analysis (FMEA) of said integrated circuit under design.

DESCRIPTION OF THE RELATED ART

Failure mode and effects analysis is a method for examining potential failures in products or processes. In the following the acronym FMEA will be preferably used. FMEA helps selecting remedial actions that reduce cumulative impacts of life-cycle consequences (risks) from a systems failure (fault). FMEA is most commonly applied but not limited to design (Design FMEA) and manufacturing processes (Process FMEA). FMEA is currently widely used in the automotive, aerospace, biomedical and other safety critical or security related industries.

The basic process of FMEA is a bottom-up analysis, i.e. to take a description of the parts of a system or of a process, and list the consequences if each part fails. In most of the cases, the consequences are then evaluated by three criteria and associated risk indices:
  severity (S),
  likelihood of occurrence (O),
  inability of controls to detect it (D)
The overall risk of each failure is called Risk Priority Number (RPN) and the product of Severity (S), Occurrence (O), and Detection (D) rankings.

In the opposite direction, the fault-tree analysis is a "top-down" procedure, that starts from an undesirable event and all the conceivable causes are enumerated. In the following the acronym FTA will be preferably used.

FMEA is used in many quality systems such as QS-9000 or ISO/TS16949. Moreover, it is the foundation of the analysis process of many international norms related to safety critical systems such for instance the international norm IEC 61508 for functional safety of electronic safety-related systems. These norms typically extend the risk indices with other indices specific to the field, such diagnostic coverage, safe failure fraction and so forth.

In general, state of the art methods to perform FMEA include either gathering data from the field (e.g. historical or statistical data of field failures) and/or performing human-driven analysis of the related system, process or component. As an example, U.S. patent application US20050154561A1 describes a method for performing FMEA of an intended process that includes gathering data related to failures and deficiencies occurring in a similar process. Based on that, potential failures and deficiencies are identified in the intended process by a first "entity" based on the gathered data. Finally, a FMEA is performed on the intended process by a second entity based on the potential failures identified by the first entity. Another example is the U.S. patent US20060122873A1 that discloses a risk management system for the development of an entity that stores information associating the selected affected entity with a particular hazard, to provide indication of risk of particular hazard to selected the affected entity.

These methods and similar ones aim in defining the FMEA process for entire systems. Nowadays, both the complexity and the high level of integration of systems require the extension of these methods to integrated circuits. For instance, car suppliers and manufacturers strive to move the responsibility for hardware integrity to the lowest level where safety could take place—the microcontroller itself. Therefore, a detailed analysis of the microcontroller is needed in order to define criticalities, impact on the system safety and possible countermeasures.

However, the number of components inside an integrated circuit is so high that previously mentioned system-oriented FMEA methods are practically inapplicable: a modern System-on-Chip easily reaches millions of gates and several millions or transistors. A more automated FMEA approach is therefore mandatory.

Few examples exist of partially automated analysis and they still relate to systems or to selected parts of the analysis process of a system. For example, U.S. Pat. No. 7,017,080 discloses a method to generate a FTA for a technical system starting from a database imported from an FMEA. This so-called "IQ-FMEA" is done through an editor in which individual faults have been entered and properly classified by an expert using such method. So the automatism is confined to a computer-aided FMEA editor and to the production of the FTA, without any hint on how to automate the extraction of fault description and related failure rates from the technical system under analysis.

Similar concepts are disclosed in publications such "Automating the Failure Modes and Effects Analysis of Safety Critical Systems", Proceedings of the Eighth IEEE International Symposium on High Assurance Systems Engineering (HASE'04), by Yiannis Papadopoulos, David Parker and Christian Grante. In that paper, FTA are synthesized and FMEA is derived from the fault trees. Also in such a case the establishment of the local failure behaviour of components is given as input in the model as a set of failure expressions and not automatically determined from the inner structure of said components.

As a consequence of the lack of detailed methods to perform FMEA of an integrated circuit, in most of the system FMEA methods, said integrated circuit is still considered as a "black" box: the FMEA makes use of fault descriptions and failure rates obtained from reliability data given by the integrated circuit producers or from data gathered from the field. As an example of that, U.S. Pat. No. 7,035,769 discloses a design FMEA method for designing electronic device, that involves associating keywords and past fail information to each design problems in database, to postulate new problems introduced by new device. Also in such case, the method rather than providing a way to analyze an electronic device, it provides the users of with a tool for handling and utilizing the results of a previously performed analytical activity.

A tentative solution to overcome this limitation is to consider the integrated circuit as a "gray" box, i.e. considering input-output relationships of the integrated circuit but without analyzing in details the internal failure modes. In such methods, FMEA is generally assisted by simulation, i.e. providing (faulty) stimuli and retrieving results. For example, Japanese patent application JP02016471A2 discloses a FMEA simulation method for analyzing circuit where a segmentation of an analyzing circuit and input/output conditions are set by a designer through a keyboard and based thereon, an FMEA simulation is executed in accordance with the procedure which is set in advance. Subsequently, based on its result and fault rank data which is inputted separately, an output of FMEA data and an output of a fault rate table are executed.

In the same way, the Italian patent IT1319009 discloses a digital logic circuit fault analysis method, creating history of states by cyclically checking internal circuit nodes while inputting standard signals and retracing when halted due to error.

In the same way, U.S. Pat. No. 4,228,537 discloses automatic fault diagnosis method for digital circuits using partial fault dictionary and on-line fault simulation comparing unit-under-test responses with fault-free circuit responses.

Disadvantages of these "gray" box methods include for instance the very long simulation time and the need to have a proper input stimuli database. Moreover, being not available a complete fault database of the circuit under simulation, there is not any link between that database and the input stimuli database: this results in a lack of completeness because fault information and failure rates are computed by inducing faults by external stimuli rather than providing a more formal and systematic way to assess the criticality of the internal parts of said integrated circuit.

In summary, the known FMEA methods present a lack of automatism, completeness and specificity with respect to analyzing integrated circuits, supplying only "black box" and "gray box" approaches by which the expert of the art is not put in the condition of retrieving—with a proper level of automatism—information from said integrated circuits under design and properly performing and validating the FMEA for such integrated circuit.

OBJECT AND SUMMARY OF THE PRESENT INVENTION

The object of the present invention is thus to answer such need of a "white-box" approach. According to the present invention, this is achieved by means of a method for performing a failure mode and effects analysis of integrated circuit having the characteristics set forth in the claims that follow. The invention also relates to a corresponding processing apparatus and a computer program directly loadable in the memory of a digital computer and comprising software code portions for performing the methods of the invention when the product is run on a computer.

Substantially, the solution according to the invention provides a complete FMEA method for any integrated circuit, such—but not limited to—Application-Specific Integrated circuit (ASIC), custom ASIC, system-On-Chip (SoC), microcontroller (MCU) and Intellectual Properties (IP) circuit such Central Processing Units (CPU), memories, peripherals and so forth.

By the proposed method, the circuit is analyzed with an automatic procedure to extract information from the integrated circuit description. As part of this method, the extracted information is used to compute circuit failure rates and other indices defined in international norms such—but not limited to—the ones defined by IEC 61508 norm.

The present invention also relates to a method to validate said FMEA of said integrated circuit under design. In this method, the computed failure rates and the other indices are validated by using a validation flow including workload acceptance, fault injection, fault simulation and result post-processing.

In summary, the FMEA method includes a first stage in which an automatic process extracts information from the integrated circuit description by partitioning it in "invariant" and "elementary" zones. Optionally, another tool extracts the usage profile of such zones under a given workload. In a second stage, the information and optionally such profile are used to prepare an FMEA database: this database is completed, in a preferred manner by an expert, using said FMEA method, by entering information related both to the safety specifications of the application where said integrated circuit is used and to the guidelines of the selected safety norms. At the end of this stage, FMEA results, including specific indices required by the selected norm, are computed and collected from the FMEA database.

In an optional third stage, the FMEA database—in particular the information not automatically computed, i.e. values provided by the expert using said FMEA method—is validated using the given circuit workload. At the end of this stage, a measured FMEA database is automatically prepared and measured FMEA results are collected from that. Then, measured FMEA results are compared with the previously computed FMEA results. In such a way, clear indications are given to the expert using said FMEA method in order to correct the previous FMEA preparation step.

Being the circuit information extraction based on "invariant" and "elementary" zones such block functions, registers, input and outputs, the method according to the invention can be used at different abstraction levels of said integrated circuit: block diagrams, Register-Transfer-Level (RTL), gate-level and layout level.

In comparison with prior art arrangements, the proposed FMEA—thanks to the white-box approach—makes possible an automated and complete FMEA, specific for risk analysis and failure rates measurement of said integrated circuit. This method can be easily combined with existing system-level FMEA or FTA methods in order to increase the quality of the overall system analysis.

The method according to the invention allows the design of optimized diagnostic circuitries able to efficiently counteract the effects of faults in said integrated circuit: thanks to the detail of provided results, the expert of the art can select the more efficient circuit architectures and techniques able to detect the failures of the most critical zones of the integrated circuit as identified by the proposed method.

DETAILED DESCRIPTION OF THE DRAWINGS

The present invention will now be described, purely by way of non-limiting example, with reference to the annexed drawings, wherein.

Before describing details of the proposed FMEA method, some definitions and basic theory of the method according the invention are described in the following.

In the context of the invention, a "failure" F is defined as the event that occurs when the delivered service of said integrated circuit or part of it deviates from the specified service, or "mission". An "error" is the part of the integrated circuit state which is liable to lead to failure. "Fault" is the phenomenological cause of the error.

An important feature of the proposed method is associated with the partition of an integrated circuit under design in "invariant" and "elementary" zones, defined as "sensitive zones".

Figure 1A:
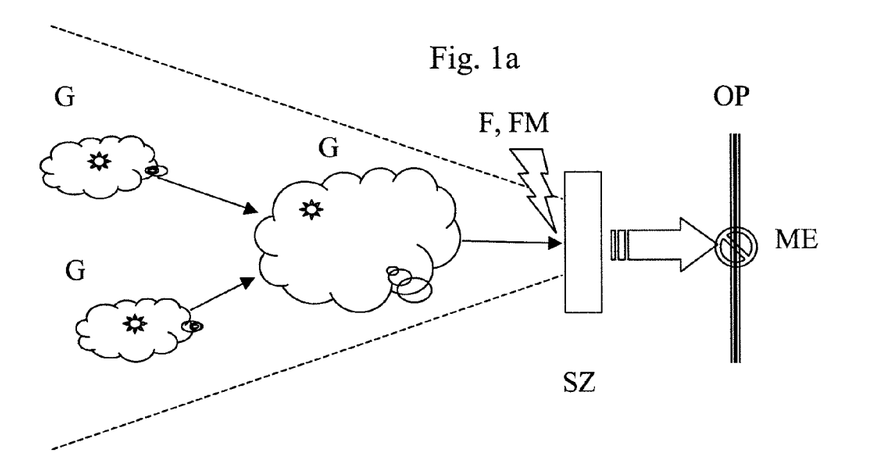
FIG. 1 a schematic diagram is shown representing sensitive zone relevant to the FMEA method according to the invention.

In FIG. 1 it is shown a diagram in which examples of sensitive zones are illustrated. In FIG. 1a faults G converge to originate a failure. A sensitive zone SZ is then the failure point of said integrated circuit in which said one or more faults G converge to lead a failure F.

In order to allow an automatic FMEA process that can be used at different abstraction levels, such sensitive zones SZ have to be "invariant", i.e. they must be maintained with respect to the abstraction level. In other words, they have to appear from the top (specifications) to the bottom (layout) level. In this context, given a certain abstraction level of the integrated circuit, "elementary" means that such sensitive zone is the smallest meaningful partition of the integrated circuit at such abstraction level in which one of the functions performed by such circuit or part of them can be identified.

For example, starting at Register-Transfer-level of abstraction, sensitive zones are selected from the register list. Integrated circuits, in particular digital processing units, are mostly architected as groups of interconnected Moore machines. In such structures, the "register" is clearly the elementary part and it has a fundamental role in the functional behaviour of the machine. Moreover, these registers are invariant being maintained at all the different level of abstractions (for example, from "variable" to "flip-flop"). Another valid example are primary inputs and primary outputs of said integrated circuit Partitioning in sensitive zones SZ is valid and can be applied in principle to both digital and analogue circuits.

Figure 1B:
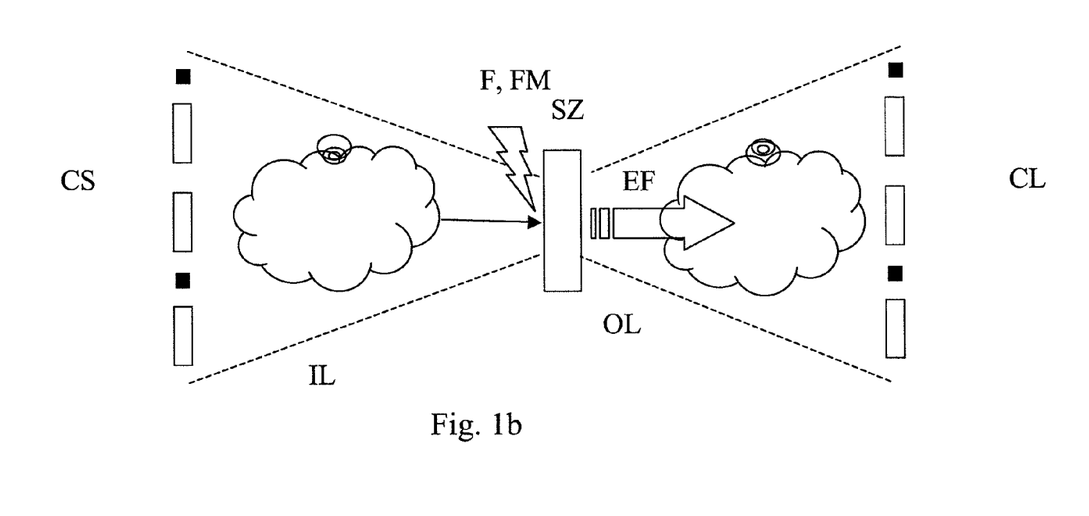

With reference to FIG. 1b, a sensitive zone is generally connected to other sensitive zones (including primary inputs and outputs of said integrated circuit) through "logic cones", respectively input cones IL and output cones OL, i.e. through groups of elements (such transistors) that for digital circuits are combined in logic gates (AND, OR and composed gates) and for analogue circuits are combined in buffers, amplifiers, current mirrors and so forth. In FIG. 1b are shown connected sources CS from others sensitive zones and/or primary inputs inputting a certain input cone IL leading to a certain sensitive zone SZ and connected loads CL in others sensitive zones and/or primary outputs to which the output cone OL from said sensitive zone SZ leads.

In FIG. 1b it is also represented an observation point OP, that is a place in the circuit where the failure F can be observed. Valid definitions of observation points OP are—by way of non limiting example—the following ones:
an internal signal or another sensitive zone;
a primary output;
a primary function of said integrated circuit;
an alarm of the diagnostic circuitry, if any, included in said integrated circuit.

In this context, the failure mode FM of a sensitive zone SZ is the way with which said sensitive zone SZ reacts to a fault G or combination of faults. A failure mode FM is of two main types:
it can be directly linked to physical faults. Example: if the sensitive zone is a memory element, it can be a bit-flip in the register
it can be the end effect EF of faults in the logic cone of the sensitive zone. Example: a wrong value in a register bit due to stuck-at or bridging faults of the combinational logic in front of the Delay pin of a register Failure modes FM can be also a temporal sum of faulty events (such multiple faults G hitting a memory element).

Concerning the correspondence between failure modes FM of sensitive zones SZ and faults G of their converging cones IL, it is also useful to distinguish two classes of physical faults: local and global faults.

"Local" faults are faults affecting one or more gates or elements of a logic cone contributing to a single sensitive zone. Each local fault or combination of them occurring in the logic cone IL in front of the sensitive zone—if not masked by conditions or by other faults—will result in a failure F in it.

"Global" faults are faults affecting one or more gates of a logic cone contributing to more than one sensitive zone SZ. Examples of global faults are—by way of non limiting example—single faults (e.g. a stuck-at the output of a gate) generating a failure in two or more sensitive zones SZ. In such a case, multiple failures occur. Such class also includes situations like faults in clock or reset buffers affecting multiple flip-flops, faults in the clock generation or first level of clock trees affecting large number of sensitive zones SZ, power supply faults affecting large areas of the silicon component, thermal faults making slower consistent region of the circuit and so forth. Faults like resistive or capacitive coupling between lines are also included in such model.

The type of failure F and failure mode FM that will occur in the sensitive zone depends on the type of occurred faults G.

In the invention, fault models are distinguished in two main classes: permanent and transient/intermittent faults. The first ones are faults determining an error or a failure that persists for all the time after the occurrence of said fault. The second ones are faults causing an error or a failure that is no longer present if power is disconnected or if another computation occurs in the same sensitive zone. Permanent faults are further split in three sub-classes depending on when they are occurring in system operation mode. If they occur during run-time, i.e. when power is on, they are classified as "permanent ON". If they occur when power is off, they are classified as "permanent OFF". If they occur during the transition between off and on (or between on and off), they are called "permanent start-up" or "permanent ST".

For all the classes, they are considered in a worst-case, e.g. stuck-at occurring on a single port of a gate for permanent faults and minimum duration of one clock cycle for transient/intermittent faults.

For more complex memory arrays (such RAM or ROM), a more detailed fault model is adopted, e.g. to take into account probability of multiple faults occurring in the same memory row. Other fault models such for instance delay faults are classified following such distinction between permanent and transient faults.

Concerning the effects of a fault, it is defined the "main effect" ME as the effect that at least will occur as result of failure mode FM of the considered sensitive zone SZ respect an observation point OP, if not masked before to reach the observation point OP. The "secondary effects" are the other effects occurring at other observation points OP resulting from the migration of the sensitive zone failure F through its output logic cone OL and from there to other sensitive zones CL till the other observation points OP. These take into account the very frequent situation in which a single local fault generates a failure F of a single sensitive zone SZ, but the effect manifests itself at different observation points OP.

The main effect ME as defined before is also characterized by the fact that it is the effect "at least and first" occurring due do the sensitive zone failure mode FM, i.e. this effect will for sure happen when the sensitive zone SZ has the correspondent failure mode FM (otherwise nothing should happen). All the other effects in the other observation points OP are considered "secondary effects".

The following additional definitions taken from IEC 61508 norm are used as a support to describe one of the possible specific embodiments of present invention.

The IEC 61508 is a norm for functional safety of electrical/electronic/programmable electronic safety-related systems.

One of the basic concepts of IEC 61508 is the definition of "safety integrity level" (SIL, in the following), i.e. the discrete level (one out of a possible four) for specifying the safety integrity requirements of the safety functions to be allocated to the safety-related systems, where safety integrity level 4 has the highest level of safety integrity and safety integrity level 1 has the lowest. Safety integrity level is granted based on the value of Safe Failure Fraction (SFF, in the following) for the given component. SFF is equal to the ratio of the sum of safe failures (i.e. failures which do not have the potential to put the safety-related system in a hazardous or fail-to-function state) plus the detected dangerous failures over the sum of all the possible failures (safe plus dangerous).

In this context, "detection" means the action of a circuitry of discovering the presence of such failure: if the detection is direct, i.e. due to the direct and autonomous action of transistors, said circuit is referred as a "HW diagnostic circuit"; if it is the consequence of a software program running on said integrated circuit, this program is referred as a "SW diagnostic test". In the following, terms like "diagnostic" or "diagnostic coverage" refers to the combined action of HW (hardware) diagnostic circuits and SW (software) diagnostic tests.

Other important definitions used in the description of the present invention are the following:
- dangerous failure (D, in the following): failure which has the potential to put the safety-related system in a hazardous or fail-to-function state
- safe failure (S, in the following): failure which does not have the potential to put the safety-related system in a hazardous or fail to-function state
- common cause failure (CCF, in the following): failure, which is the result of one or more events, causing coincident failures of two or more separate channels in a multiple channel system, leading to system failure
- diagnostic coverage (DC, in the following): the fractional decrease in the probability of dangerous hardware failures resulting from the operation of the diagnostic tests The IEC 61508 norm specifies also that requirements for the application related to safety have to be included in a document named Safety Requirements Specification (SRS). As specified in the following, said SRS is used in the FMEA preparation stage.

With reference to the concepts and definitions just discussed above, in FIG. 2 it is shown a flow diagram representing the FMEA method according to the invention.

Figure 2:
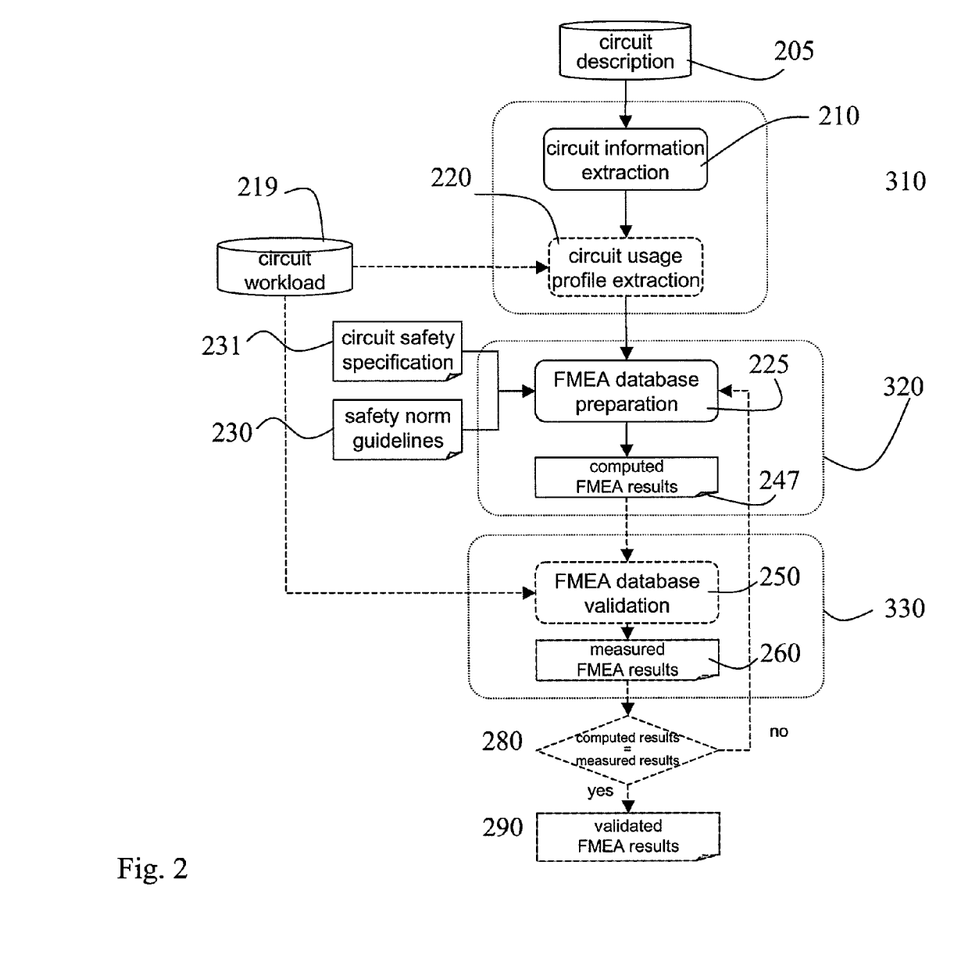
FIG. 2 a flow diagram is shown representing a FMEA method according to the invention.

Considering of having available, from previous steps of integrated circuit design, a circuit description 205, e.g. a RTL description, the method provides initially a first stage 310 that includes mainly a step of extraction of information 210 from such circuit description 205. Also the first stage 310 comprises optionally a step 220 of extraction of a circuit usage profile from a given circuit workload 219.

Figure 3:
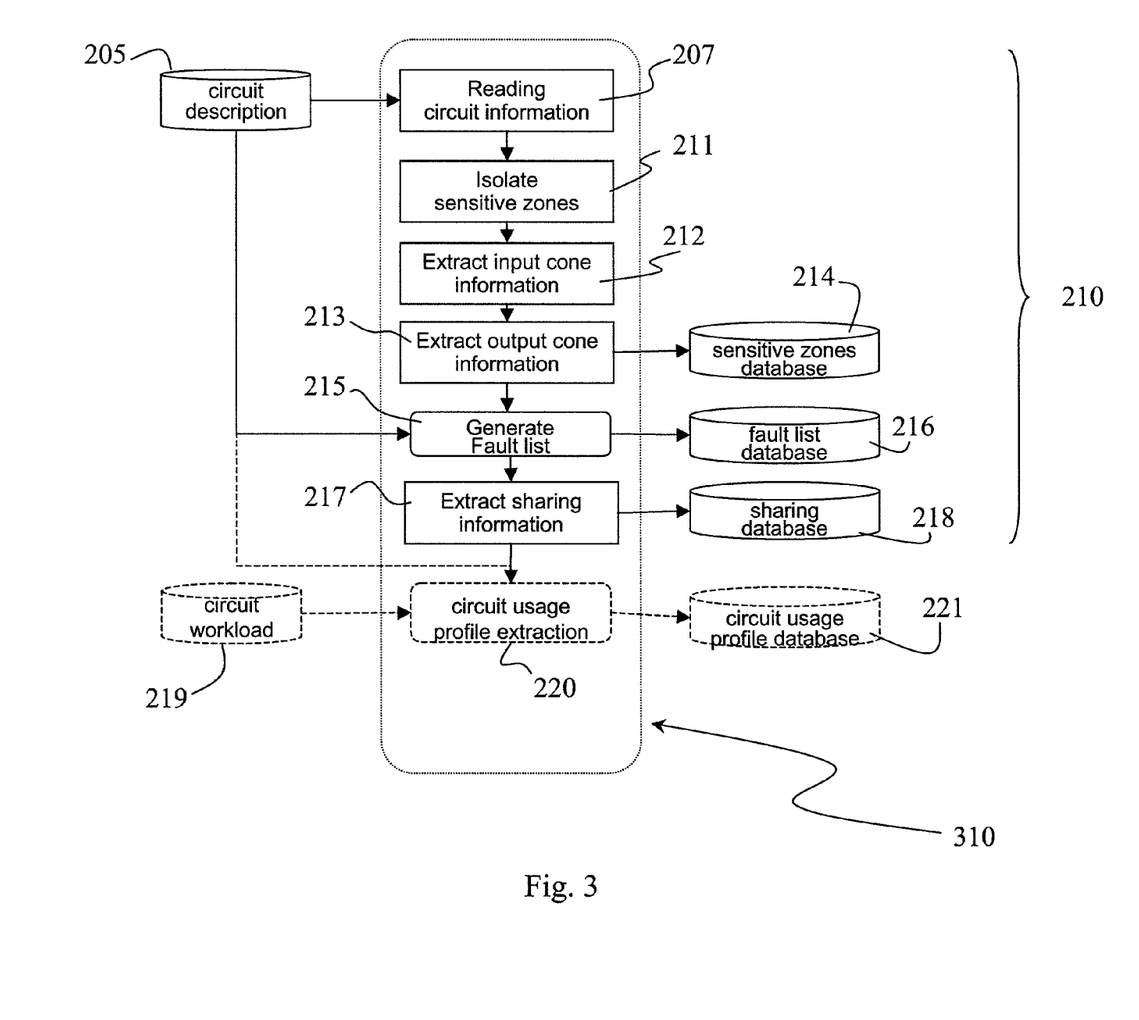
FIG. 3 a flow diagram is shown representing the details of a first stage of such FMEA method.

In FIG. 3 is represented a flow diagram showing in detail the operations of the first stage 310. The step of extraction of information 210 starts with a step of reading the circuit description 207, that is performed according to the abstraction levels of the integrated circuit under design: specifications and block diagrams are parsed with textual or graphical description analysis while RTL, gate-level and layout-level descriptions are parsed by using commercially available EDA (Electronic Design Automation) tools such VHDL (VHSIC Hardware Description Language) or VERILOG circuit description analyzers.

Then, such circuit description 205 is partitioned in sensitive zones SZ in a step of isolation of the sensitive zones 211: specifications and block diagrams are partitioned with context analysis combined with human inputs while RTL, gate-level and layout-level descriptions are partitioned by using automatic procedures available in said commercial tools. By way of non-limiting example, the following description details how sensitive zones are selected from a digital gate-level description by using said automatic procedures: a similar procedure is used for other level of abstractions or for analogue circuits.

For a digital integrated circuit represented at gate-level of abstraction, the starting point of the step of isolation of the sensitive zones 211 is the so-called "netlist". Such netlist is generated automatically at the end of standard digital integrated circuit synthesis process, performed using off-the-shelf synthesis tools. It is typically in VERILOG language or in the format delivered by the selected synthesis tool. It contains the description of all the gates of the integrated circuit and their interconnections. By using commands available in said synthesis tool, the complete list of registers of the integrated circuit is extracted from such netlist. This list is compacted by a script (in PERL language) that groups registers depending on their identifying names. Being the netlist originated from a register-transfer-level (RTL) description, these registers are the basic element of said description and therefore they represent the "elementary" sensitive zones. A formal analysis between RTL and higher or lower abstraction level of description of the integrated circuit (e.g. performed by off-the-shelf formal analysis tools) is used to guarantee that such sensitive zones SZ are invariant respect the abstraction level.

After the isolation step 211, for each of the sensitive zones SZ, input cone IL and output cone OL information are extracted in respective steps of extraction of cone input information 212 and of extraction of cone input information 213. Such input cone IL and output cone OL information includes the composition of the logic cone, such as gate and pin count, number of sources (i.e. inputs of the input logic cone IL) and loads (i.e. outputs of the output logic cone OL), interconnections and so forth. By way of non-limiting example, in case of a digital gate-level description, these information are extracted from said "netlist" by using commands available in said synthesis tool, such extraction of all the "fan-in" and "fan-out" gates of each sensitive zone, collecting gate count with a script and so forth. By way of example, a synthesis tool for Verilog such as those provided by Synopsys is provided with commands such as "transitive_fanout" and "transitive_fanin" that extract from the circuit description the number and type of the logic gates in the logic cone arriving to the input of the register (input cone) or starting from its output (output cone). From these information is straightforward to compute the gate count, such gate count being an indication of an area of the logic cone.

A sensitive zones database 214 is then composed, following steps 212 and 213, by this information together with the sensitive zones partition obtained at step 211.

Subsequently, in a step 215 a fault-list LF is generated by parsing the input and output logic cones and generating a fault-list database 216. Such database 216 is used to feed the sharing information extraction and the fault injection and fault coverage functions to a stage of FMEA database validation 330 described later in detail. This phase is performed accordingly to the abstraction levels of said integrated circuit: fault-lists of specifications and block diagrams are extracted with textual description parsing while fault lists of RTL, gate-level and layout-level descriptions are extracted by using procedures available said synthesis tools such listing the pin of each gate in the fan-in and fan-out of each registers and so forth.

On the basis of the fault-list LF obtained at step 215, in a step of extraction of sharing information 217 it is extracted the correlation between each sensitive zone SZ in terms of shared elements, gates and nets. This correlation is used to create a sharing database to be used during a phase of FMEA database validation 250 better detailed in the following and it is used to derive information related to multiple failures and secondary effects.

All the phases described so far are valid for all the levels of abstractions as also, considered in general and not in detail, for both digital and analogue circuits.

The step of extraction of information 210 of the proposed FMEA method, as mentioned, optionally includes the step of extraction 220 of the circuit and sensitive zones usage profile on the basis of a given circuit workload 219 and of the sensible zones database 214, that originates a circuit usage profile database 221. Such circuit usage profile database 221 can be optionally used in a FMEA database preparation step 221, mainly related to the step of entering the usage frequency values 235, as described afterwards.

Two examples—but not limited to—of such extraction are given in the following for a digital integrated circuit including a CPU. A workload, namely a benchmark suite or a typical application of said integrated circuit is compiled for said CPU. A "static" profile extraction is performed by parsing the disassembled file generated by the compiling process and the frequencies of occurring instructions are extracted. A "dynamic" profile extraction is performed by simulating said integrated circuit with the given workload, and the frequencies of occurring instructions are extracted by sampling the value on CPU instruction busses and/or by extracting the frequencies of activation of each sensitive zone (register) to such workload.

Still with reference to the flow diagram of FIG. 2 illustrating in the general the proposed method, a second major stage 320 of the proposed FMEA method includes a FMEA database preparation step 225 based on the results of the stage 310 including the step of extraction of information 210 and combined with information derived from safety requirement specifications (SRS) 231 and the selected safety norms guidelines 230.

Figure 4:
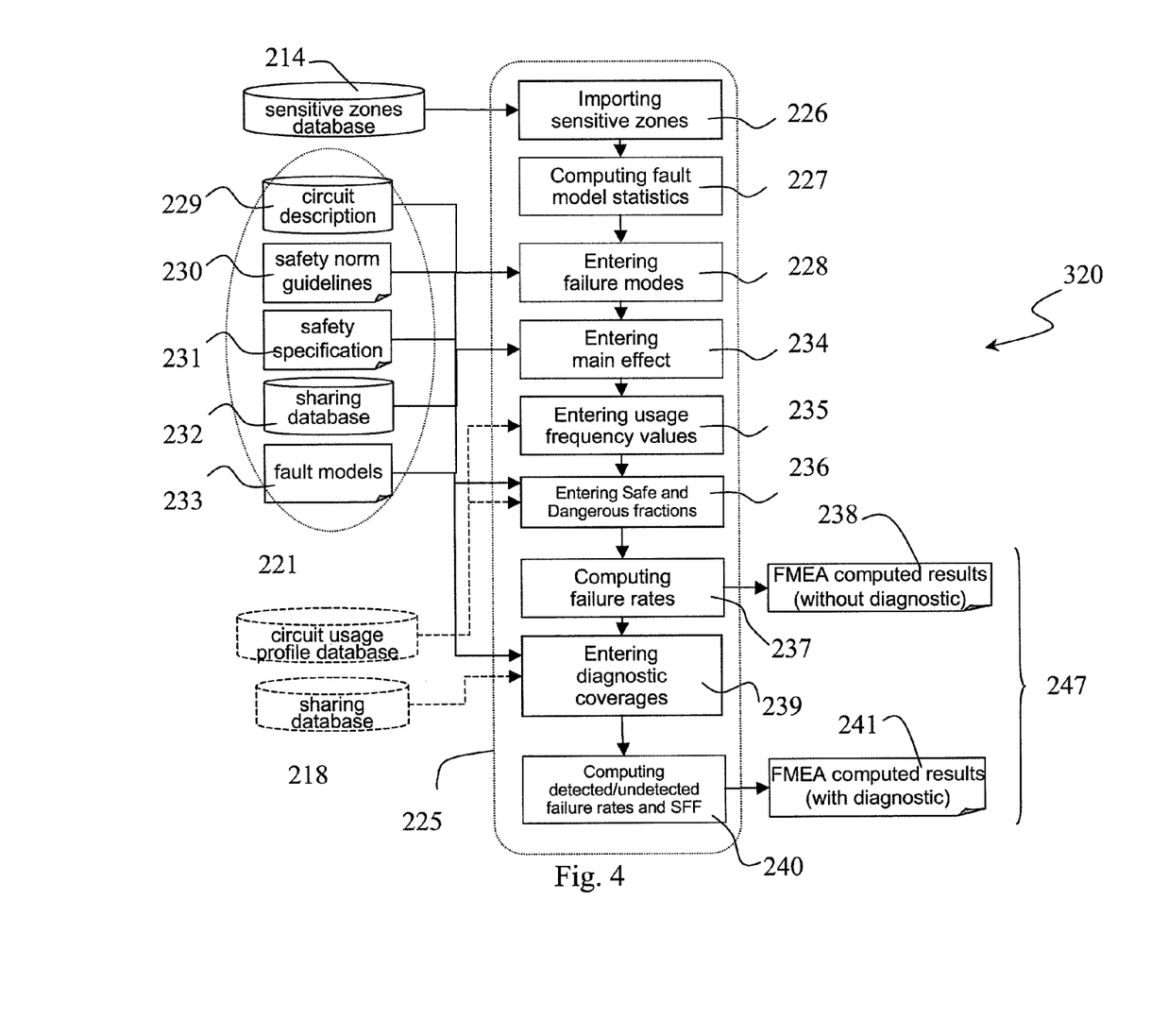
FIG. 4 a flow diagram is shown representing the details of a second stage of the FMEA method.
Figure 5:
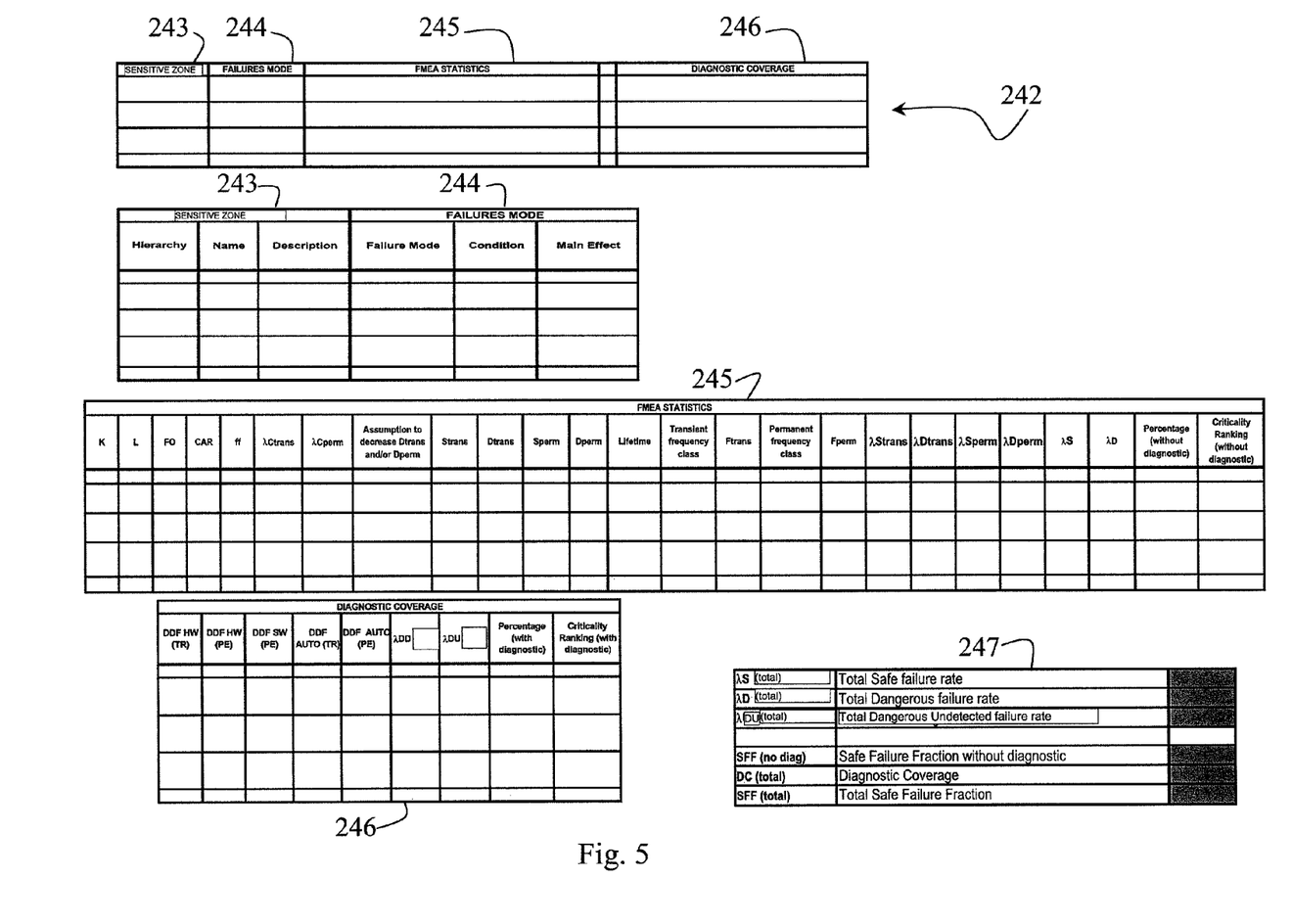
FIG. 5 a flow diagram is shown representing details of a FMEA database used in the second stage of the FMEA method.

In FIG. 4 the second preparation stage 320 and the FMEA preparation step 225 are detailed. Such FMEA preparation step 225 starts with a step 226 of importing the sensitive zones database 214. The sensitive zones information—like the other information described in the following—are imported in a FMEA database 242 which main fields are shown in FIG. 5 with respect of the exemplary embodiment for the IEC 61508 norm. The representation there given as a table is a possible example of database but it is not limited to, being possible other embodiments such with SQL databases or different fields for other specific norms.

Each line, or record, in the FMEA database sheet 242 corresponds to a possible failure mode FM of a given sensitive zone SZ. The FMEA database 242 includes four main classes of fields, that are also shown separately in detail in FIG. 5:

"Sensitive zone" 243: it reports the hierarchy, the name and the description about the considered sensitive zone SZ "Failure Mode" 244: it reports the failure mode FM, the condition under which the effect of the failure mode FM is analyzed in such row and the main effect of such failure mode FM at the observation point OP "FMEA Statistics" 245: it reports all the statistics needed to compute the corresponding failure rates for the given failure mode FM in the given sensitive zone SZ. This class considers the integrated circuit without considering the effect of HW diagnostic circuit or SW diagnostic test, if present.

"Diagnostic Coverage" 246: it reports the statistics needed to compute the Safe Failure Fraction.

Said classes of fields 243 to 246 of the database 242 are presented during the step of preparation of the FMEA database 225 for receiving values that are automatically computed or entered, as in case of safe and dangerous values, preferably by an expert user or loaded by preconfigured data files.

Fields included in these classes will be now better detailed, with reference to IEC 61508 definition described before.

After importing the sensitive zones database 214, the FMEA database 242 is provided with embedded formulas that automatically compute, in a step 227, shown in FIG. 4, the following fault model statistics for each FMEA record, starting from the statistics related to the integrated circuit without considering the effect of HW diagnostic circuit or SW diagnostic test:

Area of the corresponding sensitive zone: shown in "CAR" field of FMEA statistics class 245. By way of non-limiting example, in case of a digital gate-level description, this is derived by the sensitive zone database 214 and in particular from IL and OL logic cones information, such as the gate count. In case of specific focus to fault model such delay faults, this area can take into account length of the timing critical paths and so forth.

Number of elements of the corresponding sensitive zone: shown in "ff" field of FMEA statistics class 245. By way of non-limiting example, in case of a digital gate-level description, this is the number of registers, latches and flip-flops.

the average area of the element in the circuit: identified as "aff" in the following description. This is extracted once for all the circuit, so it is not related to a particular sensitive zone. By way of non-limiting example, in case of a digital gate-level description, this is the average area of register, latch and flip-flop of the technology library used to synthesize the integrated circuit.

Failure rate Unit for transient faults of given sensitive zone, i.e. the failure rate unit for transient faults for a single element of the sensitive zone. By way of non-limiting example, in case of a digital gate-level description, the sensitive zone SZ is a flip-flop and the failure rate unit is a value expressed in FIT/bit (i.e. FIT/flip_flop). This is the transient error rate in a single flip flop. It is referred as "$\lambda$trans_reg";

Failure rate Unit for transient faults in the logic cone of the given sensitive zone, i.e. the failure rate unit for transient faults for a single element of the sensitive zone logic cone. By way of non-limiting example, in case of a digital gate-level description, it is a value expressed in FIT/gate. It is referred as "λtrans_glue";

Failure rate Unit for permanent faults when the circuit is OFF, i.e. the failure rate unit for permanent OFF faults for a single element of the sensitive zone logic cone. By way of non-limiting example, in case of a digital gate-level description, it is a value expressed in FIT/gate. It is referred as "λperm_off";

Failure rate Unit for permanent faults when the circuit is started up or when there is the shut down, i.e. the failure rate unit for permanent ST faults for a single element of the sensitive zone logic cone. By way of non-limiting example, in case of a digital gate-level description, it is a value expressed in FIT/gate. It is referred as "λperm_startup";

Failure rate Unit for permanent faults when the circuit is ON, i.e. the failure rate unit for permanent ST faults for a single element of the sensitive zone logic cone. By way of non-limiting example, in case of a digital gate-level description, it is a value expressed in FIT/gate. It is referred as "λperm_on";

cumulative failure rate for transient faults. By way of non-limiting example, in case of a digital gate-level description, it is equal to ff*λtrans_reg+(CAR+ff*aff)*λtrans_glue=(number of flip flops) multiplied by the FIT for transient_reg, plus the total area multiplied by the transient_glue. It is shown in "λCtrans" field of FMEA statistics class 245;

cumulative failure rate for permanent faults. By way of non-limiting example, in case of a digital gate-level description, it is equal to (CAR+ff*aff)*λperm_total=total area multiplied by the cumulative FIT for all the permanent faults. It is shown in "λCperm" field of FMEA statistics class 245.

Thus, in this way the failure rate of a digital circuit is calculated by subdividing the circuit in logic cones afferent to each register and calculating such failure rate as the sum over the cones, where each single sum is subdivided in a term for the permanent faults and a term for the transient faults.

The expert using the proposed FMEA method can modify the effect of the fault model statistics by entering in the FMEA database 242 the following values:

a scaling factor. Used to increase or decrease, where necessary, the sensitive zone weight (scaling). Usually set to 1 (so no scaling). For example it can be set to 10 if the considered sensitive zone weight is to be increased by a factor of 10. In this case, its safeness/dangerousness is increased by a factor of 10. It is shown in "k" field of FMEA statistics class 245;

a multiplying factor for the combinational area of the logic cone IL or OL of a given sensitive zone SZ, taking into account how much this sensitive zone SZ is spread at the layout level. It is shown in "L" field of FMEA statistics class 245. This value can be also determined by an automatic process parsing the integrated circuit layout netlist and classifying the spread of each sensitive zone in the layout.

a multiplying factor for the weight of a given input or output, taking into account how much this input or output is interconnected with a long path. It is shown in "FO" field of FMEA statistics class 245. This value can be also determined by an automatic process parsing the integrated circuit layout netlist and classifying the spread of each sensitive zone connections in the layout.

Many other variants are possible. For example, for high-level of abstractions or for analogue blocks, an "ad hoc" statistic fault model can be entered by the expert using said FMEA database 242. Default and special fault models can be also parsed from a fault model description 233.

After the computation of the fault model statistics, in a step 228, for each sensitive zone SZ is entered the failure mode FM. The "failure mode" column reports the effect of faults in the sensitive zone SZ leading to an elementary error. Examples—but not limited to—of possible failure modes are:

"Any", in case the corresponding FMEA record does not consider any particular failure mode "bit-flip", in case the corresponding FMEA record considers the case in which a fault in the sensitive zone logic cone was caused by a transient fault changing the value of the sensitive zone "DC or stuck-at", in case the corresponding FMEA record considers the case in which a fault in the sensitive zone logic cone caused only a permanent value to appear in such sensitive zone.

At first, such step 228 is performed automatically on the basis of such circuit description 205, the safety specifications 230 and the safety norm guidelines 231 by preconfigured data files or automated choice. By way of example, the IEC 61508 norm, Part 2, Table A1, specifies faults/failure modes that have to be considered when examining a circuit in light of that norm. Then, the expert using the proposed FMEA method uses the circuit description 205, the safety specifications 230 and the safety norm guidelines 231 to change this field if needed with additional choices.

The "condition" column reports the condition under which the effect of the failure mode is analyzed in such row. An example of possible failure modes is "clock enable active" or any other possible conditions.

After entering the failure mode information, the expert using the proposed FMEA method enters in a step 234 in the failure mode class 244—for each sensitive zone—the expected main effect. The "Main effect" column reports the main effect of a certain failure mode of the considered sensitive zone respect an observation point as defined before. In case of complex relationships between the sensitive zone and the considered observation point OP, the main effect can also be determined by using one of the FTA methods existing in the related art.

After the step 234 of entering the main effect information, the expert enters—for each sensitive zone—the expected usage frequency values in a step 235. In particular, the following values are entered:

Frequency classes for transient/permanent faults related to the usage frequency of said sensitive zone. They are shown in "Transient Frequency class" and "Permanent frequency class" fields of FMEA statistics class 245;

percentage of transient/permanent faults which can be assumed to be dangerous depending on the frequency of usage (Frequency class) of that zone. These values are in range 0% . . . 100%. They are shown in "Ftrans" and "Fperm" fields of FMEA statistics class 245;

lifetime ($\zeta$) defined as the time between the last "read" operation and the "write" operation of a memory element associated with said sensitive zone. For example, in case the integrated circuit is a CPU, a general purpose register has a much higher average lifetime than the register latching that instruction in the fetch stage. It is shown in "Lifetime" field of FMEA statistics class 245;

The circuit usage profile database 221 extracted during the first stage 310 can be optionally used to automatically fill the previous described frequencies classes and corresponding values.

To avoid ambiguities, it has to be specified that such frequencies are related to how much a sensitive zone is used in the given workload. They are not the likelihood or frequencies of occurrence of faults in such sensitive zone. Likelihood or frequencies of occurrence of faults in such sensitive zone ("failure rates") are computed during step 237.

After entering, for instance as a result of computing, the expected usage frequencies information in step 235, the expert enters, in a step 236—for each sensitive zone—the safe and dangerous fractions. In particular, it is entered the estimated Safe fraction and Dangerous fraction of the possible failures for the given failure mode FM in the given sensitive zone SZ, divided in transient and permanent faults. They are shown in "Strans", "Sperm", "Dtrans" and "Dperm" fields of FMEA statistics class 245.

The S/D factors gives the percentage of safe and dangerous failures respect the total failures for the given failure mode in the given sensible zone. In general, there are two families of S/D factors.

S/D given by architectural assumptions (Sarch/Darch). They are related to the architecture of the circuit, they are totally independent from the application and their values are fully determined by the analysis of the circuit description;

S/D given by application-related assumptions (Sappl/Dappl). They are related to the possible use of the circuit and they are determined by the circuit usage profile database or directly by the safety requirement specifications (SRS) 231.

Typically, S=0% and D=100% or S=50% and D=50% as stated in the IEC 61508 norm where a detailed analysis of each failure mode FM is not possible. The expert operating with the proposed FMEA method shall enter assumptions to decrease the Dtrans or Dperm in the proper field of FMEA database.

After entering the safe and dangerous values, in a step 237 of computing failure rates, the formulas embedded in FMEA database sheet 242 automatically compute the following failure rates for each FMEA record:

the safe failure rate for transient faults, computed as $\lambda Strans=k*(\lambda Ctrans*((Strans*Ftrans)+(1-Ftrans)))$. It is shown in the "$\lambda Strans$" field of FMEA statistics class 245;

the dangerous failure rate for transient faults, computed as $\lambda Dtrans=k*(\lambda Ctrans*Dtrans*Ftrans)$. It is shown in the "$\lambda Dtrans$" field of FMEA statistics class 245;

the safe failure rate for permanent faults, computed as $\lambda Sperm=k*(\lambda Cperm*((Sperm*Fperm)+(1-Fperm)))$. It is shown in the "$\lambda Sperm$" field of FMEA statistics class 245;

the dangerous failure rate for permanent faults, computed as $\lambda Dperm=k*(\lambda Cperm*Dperm*Fperm)$. It is shown in the "$\lambda Dperm$" field of FMEA statistics class 245;

the safe failure rate, i.e. the sum of safe failure rates for transient and for permanent computed as $\lambda S=\lambda Strans+\lambda Sperm$. It is shown in the "$\lambda S$" field of FMEA statistics class 245;

the dangerous failure rate, i.e. the sum of dangerous failure rates for transient and for permanent computed as $\lambda D=\lambda Dtrans+\lambda Dperm$. It is shown in the "$\lambda D$" field of FMEA statistics class 245;

the percentage of the dangerous failure fraction respect the total dangerous failure fraction. Calculated as $\lambda D$ of this sensitive zone divided by the total summation of all $\lambda D$ of all the sensitive zones. It is shown in the "Percentage (without diagnostic)" field of FMEA statistics class 245;

the "criticality ranking", where higher values correspond to sensitive zones that have to be considered at first in the assignment of criticality levels. Calculated as percentage of the previous compute percentage of the dangerous failure fraction divided by the average percentage computed on all the sensitive zones, multiplied by 100. It is shown in the "Criticality Ranking (without diagnostic)" field of FMEA statistics class 245.

Based on these failure rates and based on indices specific to the selected norm (the IEC 61508 in the exemplary embodiment) the following FMEA results without diagnostic 238 are computed in the step 237:

total safe failure rate, computes as the sum of all the safe failure rates of each sensitive zone. It is shown in the "$\lambda S$ (total)" field of FMEA results class 247;

total dangerous failure rate, computes as the sum of all the dangerous failure rates of each sensitive zone. It is shown in the "$\lambda D$ (total)" field of FMEA results 247;

safe failure fraction without diagnostic, computed as the total safe failure rate divided by the sum of total safe failure rate plus total dangerous failure rate. It is shown in the "SFF (no diag)" field of FMEA results class 247.

As required by the IEC 61508 norm selected as a reference norm for the exemplary embodiment, after computing the failure rates, a step 239 is executed in which—for each sensitive zone—the expert enters the diagnostic coverage related to HW diagnostic circuit and SW diagnostic test, if present. If not present, all the following values are not entered and so they do not contribute to the computed FMEA results 247.

In particular, the following values are entered:

Percentage of transient DDF (Detected Dangerous Failures) detected by the HW, i.e. fraction of the dangerous failure rate associated with each failure mode FM that is claimed to be detected by the HW diagnostic circuitry, related to transient faults. It is shown in the "DDF HW (TR)" field of Diagnostic coverage class 246;

Percentage of dangerous permanent failures detected by the HW, i.e. fraction of the dangerous failure rate associated with each failure mode that is claimed to be detected by the HW diagnostic circuitry, related to permanent faults. It is shown in the "DDF HW (PE)" field of Diagnostic coverage class 246;

Percentage of dangerous permanent failures detected by the SW diagnostic tests, i.e. fraction of the dangerous failure rate associated with each failure mode that is claimed to be detected by the SW diagnostic tests, related to permanent faults. It is shown in the "DDF SW (PE)" field of Diagnostic coverage class 246;

Percentage of dangerous transient failures considered to be detected based on the analysis of the sensitive zones SZ and sharing database 218 ("auto-coverage"), as described afterwards. It is shown in the "DDF AUTO (TR)" field of Diagnostic coverage class 246;

Percentage of dangerous permanent failures considered to be detected based on the analysis of the sensitive zones SZ and sharing database 218 ("auto-coverage"), as described afterwards. It is shown in the "DDF AUTO (PE)" field of Diagnostic coverage class 246.

In particular, concerning the computation of the auto-coverage, different models are used to extract architectural coverage values from the sensitive zones and sharing databases 218. A non limitative example is here given: since quite often an integrated circuit includes a certain degree of logic sharing between the sensitive zones, such phenomenon can be taken into account during the DDF estimations. For each sensitive zone, a shape function is used to weight its sharing with other sensitive zones. The shape function specifies for example that a fault shared with at least 30 sensitive zones is to be considered auto-covered because any fault occurring in such sensitive zone will generate many effects and therefore will be easily detected by the diagnostic circuit.

After the step 239 of entering the diagnostic coverage values, a step 240 is performed in which formulas embedded in FMEA database sheet 242 automatically compute the following detected/undetected failure rates for each FMEA record:

Total dangerous detected failure rate for $\lambda$sperm_offst, i.e. for both permanent OFF and permanent ST faults, computed as: DDF_OFFST=[100%−(100%−(DDF_HW_PE+DDF_SW))*(100%−DDF_AUTO_PE)];

Total dangerous detected failure rate for $\lambda$perm_on, computed as: DDF_ON=[100%−(100%−DDF_HW_PE)*(100%−DDF_AUTO_PE)];

Total dangerous detected failure rate for $\lambda$trans, computed as: DDF_TR=[100%−(100%−DDF_HW_TR)*(100%−DDF_AUTO_TR)];

Total dangerous Detected failure rate, computed as: $\lambda$DD=Dangerous Detected failure rate=DDF_TR*$\lambda$D_trans+DDF_OFFST*$\lambda$D_perm [$\lambda$perm_offst/$\lambda$perm_total]+DDF_ON*$\lambda$D_perm*[$\lambda$_perm_on/$\lambda$perm_total]. It is shown in the "$\lambda$DD" field of Diagnostic coverage class 246;

Dangerous Undetected failure rate, computed as: $\lambda$DU=$\lambda$D−$\lambda$DD. It is shown in the "$\lambda$DU" field of Diagnostic coverage class 246;

the percentage of the dangerous undetected failure fraction respect the total dangerous undetected failure fraction. Calculated as $\lambda$DU of this sensitive zone divided by the total summation of all $\lambda$DU of all the sensitive zones. It is shown in the "Percentage (with diagnostic)" field of Diagnostic coverage class 246;

the "criticality ranking", where higher values correspond to sensitive zones that have to be considered at first in the assignment of criticality levels. Calculated as percentage of the previous compute percentage of the dangerous undetected failure fraction divided by the average percentage computed on all the sensitive zones, multiplied by 100. It is shown in the "Criticality Ranking (with diagnostic)" field of Diagnostic coverage class 246.

Based on these detected/undetected failure rates obtained in step 240 and based on the indices specific to the selected norm (the IEC 61508 in the exemplary embodiment), the following FMEA results with diagnostic 241 are computed:

total dangerous undetected failure rate, computes as the sum of all the dangerous undetected failure rates of each sensitive zone. It is shown in the "$\lambda$DU (total)" field of FMEA results 247;

diagnostic coverage, computed as the total dangerous detected failures divided by the sum of total dangerous detected failure rate plus total dangerous undetected failure rate. It is shown in the "DC (total)" field of FMEA results class 247.

safe failure fraction with diagnostic, computed as the total safe failure rate plus the total detected dangerous failure rate divided by the sum of total safe failure rate plus total dangerous failure rate. It is shown in the "SFF (total)" field of FMEA results class 247.

Thus, in this way the dangerous undetected failure rate of a digital circuit and the other indices specific to the selected norm are calculated by subdividing the circuit in logic cones afferent to each register and calculating such failure rate and indices as the sum over the cones, where each single sum is subdivided in a term for the permanent faults and a term for the transient faults. The permanent faults contribution is furthermore split in permanent faults when the circuit is off, when it is on and during start-up.

Figure 7:
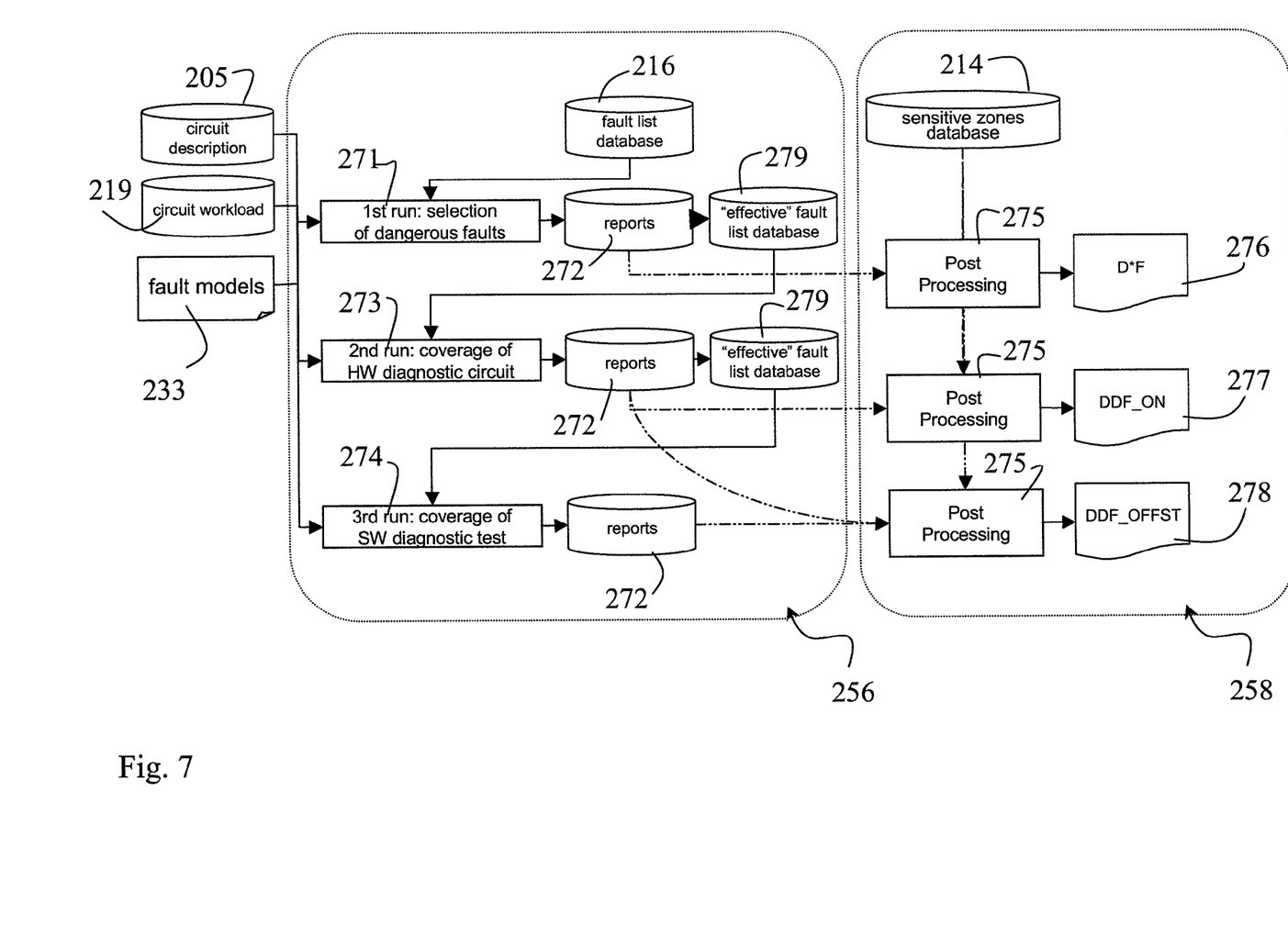
FIG. 7 a flow diagram is shown detailing a fault coverage process specific for the IEC 61508 norm.

It is worth to note that the computed FMEA results 247 include the summary values described in field of FMEA results 247 as in FIG. 7 plus all the FMEA results for each of the sensible zones SZ.

Now referring again to FIG. 2, to the second stage 320 in which the FMEA database is prepared follows a third stage 330 concerning the optional validation of such FMEA database. In particular, the third stage 330 includes a FMEA database validation step 250 based on the results 247 of the second stage 320. The FMEA database validation step 250 is an optional step because depending on the level of abstraction such validation could be performed or not. Moreover, being the validation step aimed to check the application-related information provided by the expert mainly during step 236 and partly during step 235, if these information are reliable or if worst-case values have been used, the validation step itself can be skipped.

Figure 6:
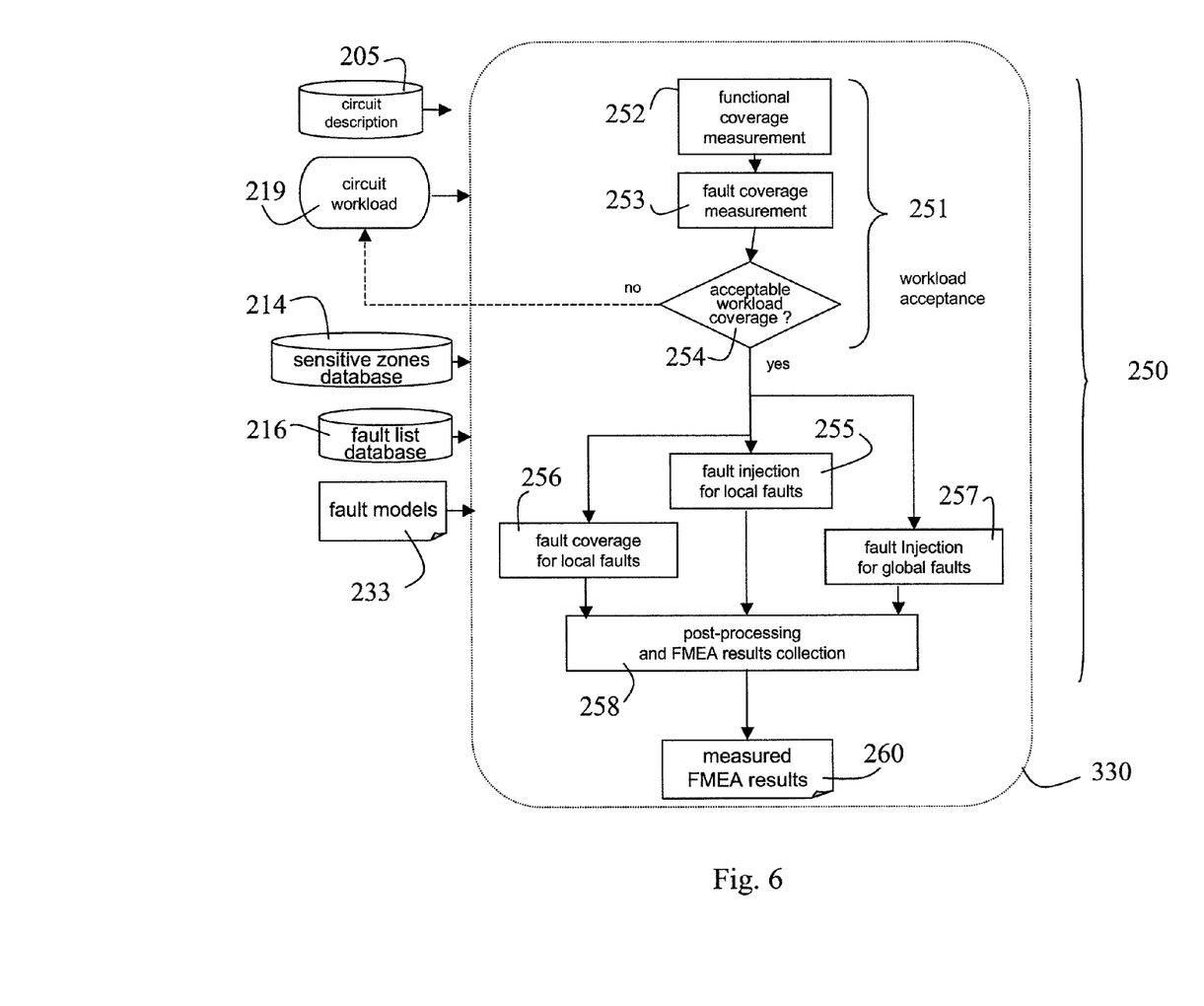
FIG. 6 a flow diagram is shown representing the details of a third stage of the FMEA method.

In FIG. 6 the FMEA database validation 250 step is detailed. The FMEA validation step 250 starts with a workload acceptance phase 251, which includes a functional coverage measurement 252 of the circuit workload 219. As mentioned in previous description, the circuit workload 219 can be a benchmark or a typical application using the integrated circuit under design. Functional coverage is measured using procedures available in commercial EDA verification tools such measurement of toggle coverage, statement coverage and so forth. To be accepted, the coverage of the workload shall be close to 100% for the circuit parts of interest. Such coverage of the workload is therefore tested in a test step 254.

Then, a fault coverage measurement 253 is performed by using the fault list database 216 generated during the step of extraction of information 210 and by using commercially available EDA tools for fault simulation. All the primary input/outputs of said microelectronic circuits are taken as observation points for the fault coverage measurement 253. To be accepted, the fault coverage of the workload shall be close to 100% for the circuit parts of interest. This is also tested in the test step 254.

After the workload acceptance phase 251, if the test step 254 yields a positive result, it is performed a fault injection operation for local faults 255 and a fault injection operation for global faults 257, both in relationship with the sensitive zone database 214 extracted during the extraction of information step 210. Fault Injection is performed by using the fault injection embodiment described in the European Patent application EP-A-1 496 435 in the name of the same Applicant. Concerning local faults, the fault injection is performed for each sensitive zone in the sensitive zone database 214. Concerning global faults, a selective fault injection is performed to verify main/secondary effects of global faults such in the clock lines, reset lines, regions where the circuit logic and diagnostic circuitry are connected, to perform a "supply-loss" test injection and so forth.

In parallel, a fault coverage analysis 256 is performed. When the selected reference norm is the IEC 61508 as in the exemplary embodiment, a specific fault coverage flow is performed in order to easily prepare the reports needed to process and collect—in the following step 258—the indices required by said IEC 61508 norm.

In particular, with reference to the flow diagram of FIG. 7, this specific fault coverage analysis 256 is performed in three sequential runs 271, 273 and 274:

first run 271, selection of dangerous faults: it is used the same procedure as for the workload acceptance run 251, i.e. the circuit is fault simulated by considering all the primary input/outputs of said integrated circuit coming from the circuit description 205 as observation points OP. The circuit workload 219 is used and the fault simulation is performed starting from the fault list database 216. Fault simulation reports 272 are generated to update the fault list database 216: this step generates a new "effective" fault database 279, which contains only the faults that could generate failure when the circuit is exercised by the given workload, i.e. only the dangerous faults. Faults in sensitive zones that are not used by said workload are excluded from such database.

second run 273, fault coverage of HW diagnostic circuit: in order to compute the diagnostic coverage of the HW diagnostic circuit, only the diagnostic outputs of said microelectronic circuits are taken as observation points OP. The "effective" fault database 279 is updated by eliminating from the database the faults detected by the HW diagnostic circuit.

third run 274, fault coverage of SW diagnostic test: this run measures the diagnostic coverage due to SW diagnostic test. All the diagnostic outputs and the SW diagnostic test outputs of said integrated circuits are taken as observation points.

The fault models 233 injected during fault injection or simulated during fault coverage measurement may vary with respect to what has been discussed above just by way of example without departing from the scope of the invention. For example, for analogue blocks, an "ad hoc" fault model can be entered by the expert using said FMEA validation procedure.

A post-processing and collection phase 258 is then performed to elaborate results of fault injection and fault coverage. When the selected reference norm is the IEC 61508 as in the exemplary embodiment, said post-processing and collection phase 258 can be obtained by a specific post processing flow performed in order to easily collect the indices required by said IEC 61508 norm. In particular, with reference to the flow diagram of FIG. 7, such post-processing and results collection 258 is shown performed in three respective sequential runs 276, 277 and 278:

first run 276: in terms of IEC 61508, this run is used to calculate the D and F values. In practice, it is easier to compute the product of these two values, i.e. the D*F value for each sensitive zone SZ taken from the database 214 by a specific postprocessing 275. Such specific postprocessing consists in the following steps: parsing the fault simulation reports 272 and the fault list database 216, dividing faults for the different sensitive zones of database 214; computing initial D*F values; applying a manipulation of these values. A non limitative example of this manipulation is the following: a manipulation of the fault coverage (identified as "hot spot fault coverage") is done to take into account that in modern deep sub-micron technologies a permanent or a transient fault will most probably lead to an error in a spot, i.e. in a group which includes a certain number of adjacent and independent ports. The post-processing 275, based on circuit netlist and layout information, calculates a new DDF value for each sensitive zone SZ, starting from the number of independent and random ports involved in the same fault location.

second run 277: this run is used to calculate the DFF_ON value, i.e. the total dangerous detected failure rate for $\lambda perm\_on$, for each sensitive zone SZ taken from the database 214 by the specific postprocessing 275 described before.

third run 278: this run is used to calculated DDF_OFFST values, i.e. the total dangerous detected failure rate for sperm_offst, for each sensitive zone SZ taken from the database 214 by the said specific postprocessing 275.

After the post-processing 258, based on indices specific to the selected norm (the IEC 61508 in the exemplary embodiment), measured FMEA results 260 are collected. In particular, the following values are collected, with reference to the database preparation step 225:

F values, identified as Fmeas
D values, identified as Dmeas
D*F values, identified as D*Fmeas
DDF values, identified as DDF_ONmeas, DDF_OFFSTmeas, DDF_TRmeas These "measured" or "meas" values correspond to the values estimated during step 235, 236, 239 and computed during steps 237 and 240. It is straightforward that the expert using said FMEA method preferring to use a full automatic process can use the measured values in place of the estimated values in those steps 235, 236 and 239.

Referring back to FIG. 2, the validation step 250 is followed by a comparison 280 between computed FMEA results 247 and measured FMEA results 260. In particular, F, D, D*F and DDF values computed during step 225 are compared with measured values Fmeas, Dmeas, D*Fmeas and DDF_ONmeas, DDF_OFFSTmeas, DDF_TRmeas measured during step 250. Results are validated if the discrepancies between these values are below an acceptable threshold decided by the expert using said FMEA method. If the comparison 280 yields a negative results, the results are unacceptable and the step 250 has to be repeated checking at first all the values that have been entered by the expert using said FMEA method such frequencies (if not computed using the circuit usage profile extraction of 220), S and D values and so forth. In most of the cases, discrepancies are due to errors in entering such values. In a few number of cases, it can be needed to refine the fault models or to add circuit specific conditions. If the comparison 280 yields a positive results, validated FMEA results 290 are obtained.

Without prejudice to the underlying principle of the invention, the details and embodiment may vary, also significantly, with respect to what has been discussed just by way of example without departing from the scope of the invention, ad defined by the claims that follow.

The primary field of application of the arrangement disclosed herein is the analysis of microcontrollers or System on Chip, e.g. for automotive applications and in the framework of IEC 61508 norm, but it is clear that the scope of the invention extends to the analysis of all systems comprising a integrated circuit and in the framework of other norms for quality, reliability or security (such ISO26262 or CC/ITSC EAL) or of other fields such aerospace, biomedics and data security.

The FMEA method can be performed on any computer or other processing apparatus, represented also by distributed processing modules, suitable for performing the steps of preparing a FMEA database of a integrated circuit under design and computing FMEA results from said FMEA database, automatically extracting information from a integrated circuit description reading integrated circuit information, partitioning the circuit in invariant and elementary sensitive zones, using said information in said preparation step of a FMEA database, as well as the other operations described and claimed of the proposed method.

The invention claimed is:

1. A method for performing failure mode and effects analysis (FMEA) on integrated circuits comprising:
preparing by a processor a FMEA database of a integrated digital circuit under design and computing FMEA results from said FMEA database, said FMEA database comprising records relative to zones (SZ) of said circuit;
automatically extracting information from a integrated circuit description, at least at the gate level of abstraction, said extraction of information comprising:
reading integrated circuit information;
partitioning said circuit in elementary sensitive zones (SZ);
said partitioning including selecting as zones registers from a netlist at gate level; and
extracting logic cone information associated to said sensitive zones, said extracting comprising extracting input cone information and extracting output cone information;
composing a sensitive zone database including said sensitive zone partition and the related logic cone information;
using said information in the preparing the FMEA database, importing said sensitive zone database in said FMEA database;
automatically computing by the processor on the basis of the information in said sensitive zone database fault model statistics for each record including failure rates for each sensitive zone; and
using said fault model statistics for each record including failure rates for each sensitive zone for automatically computing in said FMEA database failure rates for each FMEA record and on the basis of said computer failure rates computing FMEA results.

2. The method of claim 1 further comprising extracting the circuit usage profile from a circuit workload and of using said profile in said preparation step of a FMEA database.

3. The method of claim 1 further comprising entering information related to the circuit safety specifications and based on safety norms guidelines in said preparation step of a FMEA database.

4. The method of claim 1 further comprising a step of validation of the FMEA database using the circuit workload and a subsequent step of extraction of measured FMEA results from said measured FMEA database or a repetition of said preparation step of a FMEA database.

5. The method of claim 4 wherein the step of validation of the FMEA database includes a workload acceptance phase, that includes a functional coverage measurement of said circuit workload and a fault coverage measurement that makes use of the fault list database.

6. The method of claim 5, further comprising testing the results of the functional coverage measurement and of the fault coverage measurement.

7. The method of claim 6, wherein the testing yields a positive result, includes performing a fault injection operation for local faults and a fault injection operation for global faults in the sensitive zones (SZ) indicated in the sensitive zone database.

8. The method of claim 6, further comprising performing a fault coverage analysis taking all diagnostic outputs as observation points (OP) for the fault coverage measurement.

9. The method of claim 8, wherein said fault coverage analysis includes three sequential runs, a first run taking as observation points (OP) all the primary input/outputs of said integrated circuit under design coming from the circuit description and the circuit workload, a second run taking all the diagnostic outputs of said microelectronic circuits as observation points (OP), a third run measuring the diagnostic coverage due to SW diagnostic test for each sensitive zone (SZ).

10. The method of claim 8, further comprising a post-processing for elaborating the results of fault injection and fault coverage steps and a collection of the FMEA validation results.

11. The method of claim 10, wherein said post-processing and said collection includes a post processing flow for the norm IEC 61508 suitable for collecting indices required by said IEC 61508 norm.

12. The method of claim 10, wherein said post-processing and said collection includes a post processing flow for the norm ISO26262 suitable for collecting indices required by said ISO26262 norm.

13. The method of claim 11, wherein said post processing flow for the norm IEC 61508 is performed in three sequential specific runs, the runs comprising:
a first specific run for calculating as index the product of Dangerous Failure to Failure value (D*F) for each sensitive zone (SZ) taken from the sensitive zone database by a specific postprocessing;
a second specific run for calculating as index a total dangerous detected failure rate for permanent ON faults (DFF_ON) value for each sensitive zone (SZ) taken from the sensitive zone database by said specific post-processing;
a third specific run for calculating as index a total dangerous detected failure rate for both permanent OFF and permanent ST faults (DDF_OFFST) value for each sensitive zone (SZ) taken from the database (214) by said postprocessing; and
wherein said specific postprocessing comprising parsing fault simulation reports and fault list database, dividing faults for the different sensitive zones (SZ) defined in the sensitive zone database, computing initial index values, applying a manipulation of said index values.

14. The method of claim 13, further comprising comparing between computed FMEA results and measured FMEA results and if a result of the comparing is below an acceptable threshold said repetition of said preparation step of a FMEA database is performed, if the result of said comparison yields a positive results, validated FMEA results are produced.

15. The method of claim 1, further comprising generating a fault-list (LF) by parsing said input (IL) and output (OL) logic cones and generating a fault-list database.

16. The method of claim 1, further comprising extracting information on shared elements by evaluating the correlation between each sensitive zone (SZ) in terms of shared elements, gates and nets, and creating a sharing database.

17. The method of claim 1, wherein said FMEA database includes presenting records, each of the records corresponding to a possible failure mode (FM) of a given sensitive zone (SZ) and each record includes a sensitive zone field, a failure mode field, a FMEA statistics field and a diagnostic coverage field.

18. The method of claim 17, further comprising presenting one or more field of said records for receiving for each sensitive zone (SZ) a failure mode (FM) representing the effect of faults (G) in the sensitive zone (SZ) leading to an error, on the basis of the circuit description, the safety specifications and the safety norm guidelines.

19. The method of claim 17, further comprising presenting said failure mode field of said records for receiving in the each sensitive zone (SZ) an expected main effect (ME) representing a certain failure mode (FM) of the corresponding sensitive zone (SZ) with respect to an observation point (OP).

20. The method of claim 17, wherein FMEA database automatically computes detected/undetected failure rates for each FMEA record and on the basis of said computed detected/undetected failure rates computes FMEA results with diagnostic.

21. The method of claim 19, further comprising presenting said FMEA statistics field of said records for receiving for each sensitive zone (SZ) expected usage frequency values.

22. The method of claim 21, further comprising presenting said FMEA statistics field of said records for receiving for each sensitive zone (SZ) safe and dangerous values.

23. The method of claim 22, wherein said receiving for each sensitive zone (SZ) safe and dangerous values includes receiving an estimated Safe fraction and Dangerous fraction of the possible failures for the given failure mode (FM) in the given sensitive zone (SZ), divided in transient and permanent faults.

24. The method of claim 22, wherein said FMEA database automatically computes failure rates for each FMEA record and on the basis of said computed failure rates computes FMEA results without diagnostic.

25. The method of claim 24, further comprising receiving for each sensitive zone (SZ) the diagnostic coverage.

26. The method of claim 25, wherein said receiving for each sensitive zone (SZ) the diagnostic coverage includes performing an auto-coverage computation, taking in account for DDF estimations (DDF AUTO (TR), DDF AUTO (PE)) the logic sharing between the sensitive zones (SZ) on the basis of said sharing database.

27. The method of claim 25, wherein said receiving for each sensitive zone (SZ) the diagnostic coverage includes performing an auto-coverage computation includes using for each sensitive zone (Z) a shape function to weight the sharing degree with other sensitive zones.

28. The method of claim 1, wherein said fault models are built distinguishing faults (G) originating failures (F) occurring in a sensitive zone (SZ) between permanent and transient/intermittent faults.

29. The method of claim 28, further comprising distinguishing said permanent faults in "permanent ON", "permanent OFF" and "permanent ST" depending on when they are occurring in system operation mode.

30. A processing apparatus configured for performing the steps of the method of claim 1.

31. A computer program product directly loadable in the memory of a computer and comprising software code portions for performing the method of claim 1 when the product is run on a computer.

* * * * *